United States Patent [19]

Chatelin

[11] Patent Number: 4,465,267
[45] Date of Patent: Aug. 14, 1984

[54] DIAPHRAGM SPRINGS

[75] Inventor: Jean-Pierre Chatelin, Franconville, France

[73] Assignee: Valeo, Paris, France

[21] Appl. No.: 311,249

[22] Filed: Oct. 14, 1981

[30] Foreign Application Priority Data

Oct. 17, 1980 [FR] France .............................. 80 22211

[51] Int. Cl.³ .............................................. F16F 1/32
[52] U.S. Cl. .................................. 267/161; 192/89 B
[58] Field of Search ............... 192/89 B; 267/161, 162

[56] References Cited

FOREIGN PATENT DOCUMENTS 1272453  4/1972  United Kingdom ................ 267/161

Primary Examiner—Duane A. Reger
Attorney, Agent, or Firm—Charles E. Brown

[57] ABSTRACT

A diaphragm spring for use in a motor vehicle clutch of a variable pitch drive pulley is disclosed. The diaphragm spring is of the type comprising a Belleville washer peripheral portion and a central portion divided into radial fingers separated by radial slots. Apertures alternate with the roots or radial outer ends of the radial fingers and open radially into the slots. These apertures consist of relatively larger area main apertures and relatively smaller area intermediate apertures. The radially outer edges of all the apertures lie along the same circumference of the diaphragm spring. The diaphragm spring is devoid of ribs. The diaphragm spring is rigidified along the circumference by the extra material formed around the smaller intermediate apertures, while maintaining a peripheral portion of constant radial extent throughout.

8 Claims, 4 Drawing Figures

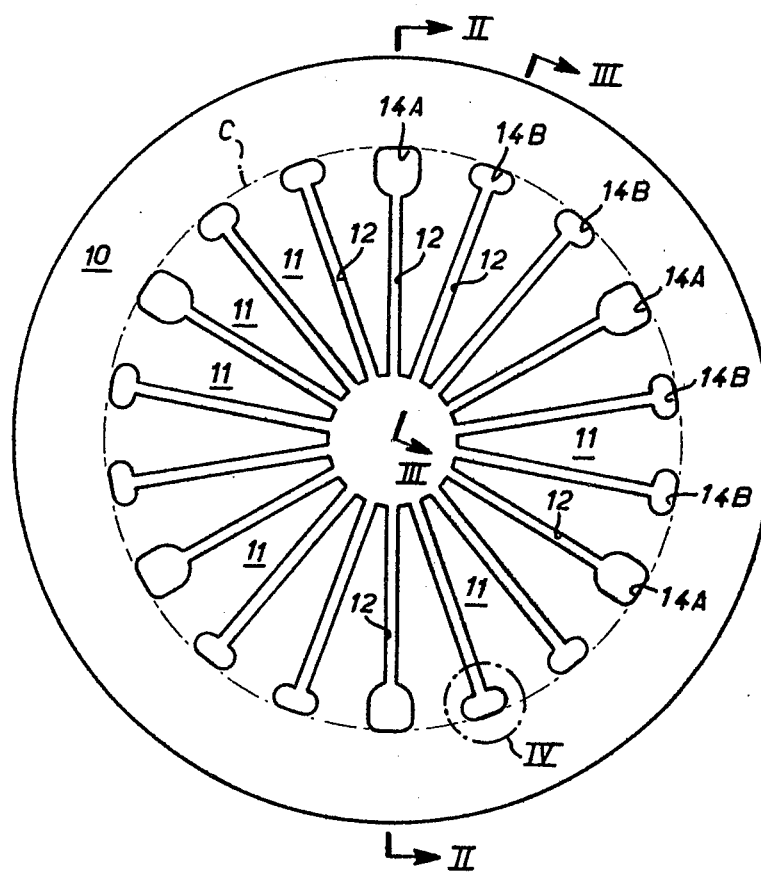
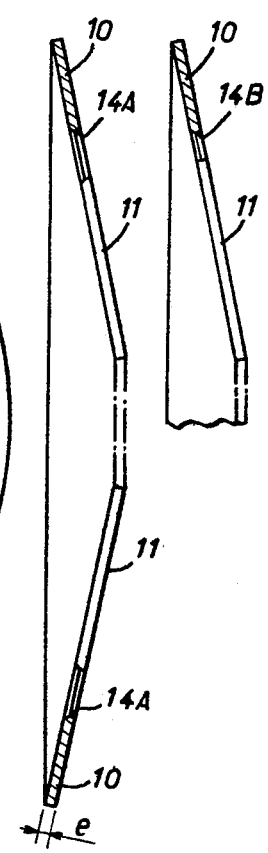
FIG.1  FIG.2  FIG.3
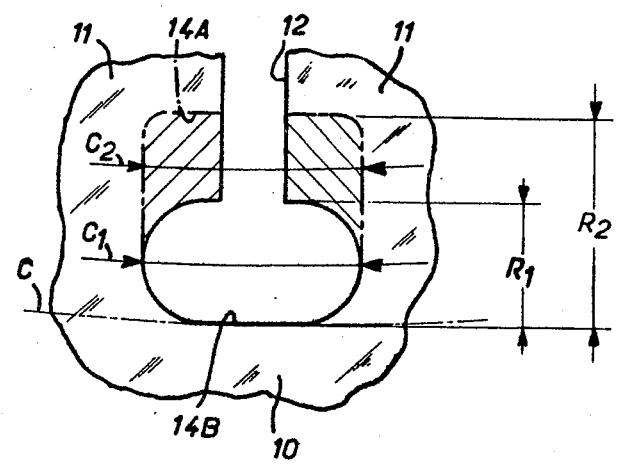
FIG.4

DIAPHRAGM SPRINGS

FIELD OF THE INVENTION

The present invention relates generally to so-called diaphragm springs which are one of the essential component parts of diaphragm clutches such as used in motor vehicles and of variable pitch drive pulleys.

BACKGROUND OF THE INVENTION

Such diaphragm springs are generally annular members comprising a continuous, Belleville washer peripheral portion and a central portion divided into a plurality of radial fingers, which diaphragm springs have a generally frustoconical configuration in the rest or unloaded position.

The Belleville washer peripheral portion comprises axially acting resilient means which in the context of a diaphragm clutch bear against the fixed housing called a cover and carry the axially movable member called a pressure plate so that the latter is at all time biased toward its engagement position. At the same time the radial fingers of the central portion comprise release levers which in response to the action of a part called a release bearing are adapted to control the freeing of the pressure plate through the Belleville washer peripheral portion and thereby its displacement from the engaged to the disengaged position.

In practice, in the vicinity of the roots or radially outer ends of the radial fingers and alternating therewith, the diaphragm spring comprises apertures which open radially into slots which separate the radial fingers from one another.

Some of these apertures, referred to herein as the main apertures, are employed for receiving the lugs, tabs, rivets or the like for rockably mounting the diaphragm spring on the cover; the area of the apertures is therefore determined by the cross-sectional area of the corresponding lugs, tabs, rivets or the like.

For practical manufacturing and assembly reasons all the apertures in such a diaphragm spring have up to the present usually been identical and each of the apertures which are not intended to receive the tabs, lugs, rivets and the like defines an area equal to that of those which are actually employed.

One difficulty with the making of such a diaphragm spring results from the fact that in the course of clutch disengagement the radial fingers of the central portion do not have the same angle of inclination as the peripheral portion of the diaphragm spring; in general the angle of inclination of the flexing radial fingers is greater than that of the peripheral portion. This produces less pressure plate lift, i.e., disengagement displacement, for a given release bearing travel and in addition, there is an enhanced possibility of circumferential waving or undulations in the Belleville washer peripheral portion which may cause rupture.

Various attempts to ameliorate this difficulty have been proposed.

For example, in German ALS No. 2, 757,892 additional apertures are provided which are arranged along the same circumference as the apertures receiving the lugs, tabs, rivets or the like which alternate with the same but do not open into slots and have areas substantially equal to those of the apertures utilized. Such an arrangement which comes down to modifying the ratio between the nonperforate portions and the apertures along the circumference concerned, alters the load characteristics of the diaphragm spring.

In French printed patent application No. 2,244,101 the radial fingers are provided with ribs for their rigidification and these ribs may extend into the Belleville washer peripheral portion. But as above, this arrangement which is moreover difficult to carry out, affects, all other things being equal, the load characteristics of the diaphragm spring. Further, in this printed application there is a difference in size of the various apertures but effects produced by this difference are mentioned.

The present invention is based on the observation that differential sizing of the apertures alone is sufficient to obtain satisfactory rigidification of the radial fingers of the diaphragm spring, without any need to rib the radial fingers. This result may be explained by the increased size of some of the radial fingers in the vicinity of their roots or radial outer ends.

On the other hand, it could not have been apparent to one skilled in the art having knowledge of French printed patent application No. 2,244,101 who would normally have attributed the rigidification observed to the ribbing of the radial fingers of the diaphragm spring which is explicitly provided for this purpose.

SUMMARY OF THE INVENTION

According to the invention there is provided a diaphragm spring for use in a motor vehicle clutch comprising a Belleville washer peripheral portion and a central portion divided into a plurality of radial fingers separated by radial apertures located in the vicinity of the roots or radial outer of the radial fingers and alternating therewith said apertures opening radially into the slots. The diaphragm spring according to the invention is characterized by some of the apertures, called intermediate apertures, being of smaller area than others, called main apertures, the radially outer edge of each of said apertures lying substantially tangent to a circumference of the diaphragm spring, both the radial fingers and the Belleville washer peripheral portion being plain-walled, that is unribbed.

FURTHER PRIOR ART

It is known, to be sure, to make some of the apertures of smaller area as taught in British patent No. 1,272,453. Yet, in this patent it is specifically provided that the apertures are radially staggered relative to one another. Consequently, the Belleville washer peripheral portion has an uneven radially inner limit and a nonuniform, scalloped configuration which is detrimental to operating conditions and thereby its service life.

Such is likewise the case with the embodiments disclosed in French printed patent application No. 2,059,206 having apertures of different areas.

Advantageously, there are no such irregularities in the Belleville washer peripheral portion of the diaphragm spring according to the invention which is of constant radial extent between the said circumference and the free outer edge of the diaphragm spring.

BRIEF DESCRIPTION OF THE DRAWINGS

The objects, features and the advantages of the invention will be brought out in the description which follows, given by way of example with reference to the accompanying schematic drawings.

FIG. 1 is an elevational view of a diaphragm spring embodying the invention;

FIG. 2 is a cross-sectional view taken on line II—II in FIG. 1;

FIG. 3 is another cross-sectional view taken on line III—III in FIG. 1; and

FIG. 4 is an enlarged fragmentary view of the portion of the diaphragm spring enclosed within the phantom-line circle in FIG. 1.

DETAILED DESCRIPTION OF THE PREFERRED EMBODIMENT

The drawing illustrates a diaphragm spring of the type suitable for diaphragm clutches for motor vehicles.

The diaphragm spring is a generally annular part of frustoconical configuration, usually made of conventional spring steel and comprising a Belleville washer peripheral portion 10 in other words an annular region extending along the entire outer periphery of the diaphragm spring, and a central portion divided into radial fingers 11 by radial slots 12.

Apertures 14A, 14B are provided in the vicinity of the radially outer ends or roots of the radial fingers 11 and alternate therewith. The apertures 14A, 14B open respectively into the radial slots 12 separating the radial fingers 11. In actual practice, each of the apertures 14A, 14B comprises a circumferentially enlarged blind end of its associated radial slot 12.

According to the invention, some of the apertures referred to as intermediate apertures 14B, each have an area less than that of the other apertures referred to as the main apertures 14A in the illustrated embodiment, and all the apertures 14A, 14B have their radially outer lying substantially tangent to the same circumference of the diaphragm spring. This circumference is represented schematically in FIGS. 1 and 4 by a phantom line c. Furthermore, the radial fingers 11 and the Belleville washer peripheral portion 10 are plain-walled.

In other words, the intermediate apertures 14B define openings smaller than those of the main apertures 14A. And in conjunction therewith no ribs are provided in the radial fingers 11 or the Belleville washer peripheral portion 10.

In practice, as best seen in FIG. 4 where a main aperture 14A shown in chain-dotted lines is superimposed on an intermediate aperture 14B shown in solid lines, the circumferential extent C1 of an intermediate aperture 14B defined between its opposed generally radially extending edges is equal to the circumferential extent C2 of the main aperture 14A, whereas the radial extent R1 of the intermediate aperture 14B is less than the radial extent R2 of the main aperture 14A. Preferably, the radial extent R1 of the intermediate apertures 14B is equal to at least half the radial extent R2 of the main apertures, and preferably, in conjunction therewith, the radial extent R1 is at least equal to the thickness e of the diaphragm spring.

Thus, good rigidification of the radial fingers 11 is obtained owing to the extra material around the intermediate apertures 14B in circumferential alignment with the main apertures; this extra material is schematically illustrated by the hatching within the imaginary confines of the superimposed main aperture 14A. This enhanced rigidification results without this extra material substantially altering the distribution of perforate and nonperforate areas along the circumference C or modifying the characteristics of the diaphragm spring.

Further, the stresses along the circumference C remain relatively moderate.

In practice, only the main apertures 14A are adapted to receive the lugs, tabs, rivets or the like, as is known per se. Accordingly, the generally radial edges of the main apertures 14A are substantially straight as shown. On the other hand, the lateral edges of the intermediate apertures 14B extend generally radially and are preferably semicircular to better distribute the stresses.

In the illustrated embodiment the main apertures 14A alternate with pairs of intermediate apertures 14B, two intermediate apertures 14B being arranged between two successive main apertures 14A, all the intermediate apertures 14B being identical and all the main apertures 14A being identical.

Alternatively, the main apertures 14A and the intermediate apertures 14B may alternate with one another.

It goes without saying that the present invention is not intended to be limited to the illustrated and described embodiment but encompasses all modifications and alternatives understood by those skilled in the art, without departing from the spirit and scope of the invention.

What is claimed is:

1. A diaphragm spring for a motor vehicle diaphragm clutch, the diaphragm spring comprising a Belleville washer peripheral portion and a central portion divided into radial fingers separated by radial slots, apertures located in the vicinity of the roots or radial outer ends of said radial fingers and alternating therewith, said apertures opening radially into respective radial slots, said apertures comprising intermediate apertures and main apertures, the areas of said intermediate apertures being smaller than the areas of said main apertures, each of said apertures having a radially outer edge lying tangent to a single circumference of said diaphragm spring, said radial fingers and said Bellevelle washer peripheral portion being plain-walled, the circumferential extent of said intermediate apertures being equal to that of said main apertures, and the radial extent of said intermediate apertures being less than that of said main apertures.

2. The diaphragm spring of claim 1, wherein said main apertures only are designed to accommodate assembly means.

3. The diaphragm spring of claim 2, wherein the radial extent of said intermediate apertures is equal to at least half that of said main apertures.

4. The diaphragm spring of claim 1, wherein said main apertures alternate with pairs of said intermediate apertures.

5. The diaphragm spring of claim 1, wherein said main apertures alternate with intermediate apertures.

6. The diaphragm spring of claim 1, wherein lateral edges of said intermediate apertures which extend generally radially are semicircular.

7. The diaphragm spring of claim 1, wherein said radial fingers and said Belleville washer peripheral portion are unribbed.

8. The diaphragm spring of claim 1, wherein radial extent of said peripheral portion of said diaphragm spring measured between the radial outer edge of each of said apretures and the peripheral edge of the diaphragm spring is uniform throughout.

* * * * *